(12) United States Patent
Rietsch, Jr.

(10) Patent No.: US 7,219,385 B1
(45) Date of Patent: May 22, 2007

(54) BRUSH AND METHOD FOR CAR WASH

(76) Inventor: Gilbert J. Rietsch, Jr., 6269 Mockingbird La., Clarkston, MI (US) 48346

(*) Notice: Subject to any disclaimer, the term of this patent is extended or adjusted under 35 U.S.C. 154(b) by 445 days.

(21) Appl. No.: 10/407,862

(22) Filed: Apr. 4, 2003

(51) Int. Cl.
*B60S 3/06* (2006.01)
*B24D 13/04* (2006.01)

(52) U.S. Cl. .................. 15/97.3; 15/53.2; 15/230.14

(58) Field of Classification Search ........ 15/53.1–53.3, 15/97.3, 179, 181, 230, 230.12, 230.14, 230.16
See application file for complete search history.

(56) References Cited

U.S. PATENT DOCUMENTS

| | | | | |
|---|---|---|---|---|
| 2,039,677 | A | * 5/1936 | Brooks | 15/230.14 |
| 3,067,444 | A | * 12/1962 | Dickson et al. | 15/97.3 |
| 4,611,359 | A | * 9/1986 | Bivens | 15/97.3 |
| 6,564,418 | B1 | * 5/2003 | Favagrossa | 15/230.16 |
| 2003/0079308 | A1 | * 5/2003 | Clark | 15/230.16 |
| 2004/0200024 | A1 | * 10/2004 | Yamin | 15/230.16 |

FOREIGN PATENT DOCUMENTS

EP 0 875 171 A1 * 11/1998

OTHER PUBLICATIONS

English translation of Abstract of EP 0 875 171.*
AU 725783; Weigele, Gebhard; Nov. 1998.*

* cited by examiner

*Primary Examiner*—Gladys J P Corcoran
*Assistant Examiner*—Laura C Guidotti
(74) *Attorney, Agent, or Firm*—John R. Benefiel

(57) ABSTRACT

A brush for a car wash has radial arrays of fingers cut from flat sheets of closed cell foam. The finger arrays are stacked atop each other with interposed spacer discs, bonded together to form sections of the brush. A top brush has a center section core formed by the spacer discs of a larger diameter than two smaller core diameter ends to provide a larger diameter center section core caused to roll when encountering a vehicle surface to pass over the some without damage, and smaller core diameter end sections able to accommodate antennas with less bending. The fingers of the scrubbing section of the brush are short, no longer than and are held sufficiently stiffly to support the brush on the side rails of pickup cargo beds at a high enough height as to avoid finger contact with the cargo bed bottom surfaces.

15 Claims, 7 Drawing Sheets

BRUSH AND METHOD FOR CAR WASH

BACKGROUND OF THE INVENTION

This invention concerns car wash brushes and more particularly horizontal top brushes which extend across the top of a car or vertical side brushes which are positioned on each side of the car body. These brushes are rotated as they pass over the upper or side surfaces of a car body as it transmits through the car wash tunnel to effect cleaning of these surfaces. The top brush is mounted on a counter-weighted frame which pivots to allow the rotating top brush to move up and down as the brush contacts the various vehicle surfaces, with a preset contact pressure exerted by an adjustment of the counterweighting. Such top and side brushes have in the past used closed cell foam fingers which are long and flaccid. Washing is achieved by a scrubbing action carried out by the tips of the fingers which are held extended by rotation of the brush core at a relatively high speed, i.e., in excess of 100 rpm, with the long length and speed of rotation creating sufficient centrifugal force to hold the tips out stiffly to create adequate scrubbing pressure without folding of the fingers.

The tips must be held extended out to develop proper scrubbing pressure, since if the fingers bend over, scrubbing pressure is substantially compromised. Thus, a high speed rotation and a large brush diameter (50 inches or larger) is required to create the level of centrifugal force acting on the fingers necessary to achieve this result.

In prior designs, such top brushes have had a constant diameter core from which the foam brush fingers extend radially. The brush core in the prior top brush designs were of a relatively small diameter, i.e., 10 inches, since car antennas would be bent too far when the brush passes over the same if the cores were of a substantially greater diameter. The long flaccid fingers which are extended by rotation at a relatively high speed, define a space for the antenna to pass through without excessive bending of the antenna.

The prior top brushes sometimes create difficulties when the small diameter core encounters a sharply vertical surface vehicle when the brush is not rotating as when a vehicle is driven through the wash tunnel without the equipment operating or when the brush is not rotating because of an equipment failure since the small diameter core will often wedge against such a surface, stopping the vehicle or breaking the brush or frame.

The high speed rotation of the fingers in both the top and side brushes create the possibility of vehicle damage by the fingers snagging some feature on a washed vehicle exterior.

Another difficulty concerns the possibility of the brush fingers of a top brush descending completely down into the bed of a pickup, kicking up debris collecting in the bed as the long fingers held out by centrifugal force reach down into every crevice of the bed. The long fingers straddle the side rails and allow the brush to descend to create contact with the bed bottom.

It is the object of the present invention to provide a car wash brush construction for both top and side brushes which does not require rotation at high speed.

It is another object to provide a top brush which avoids jamming of a top brush core when encountering a vertical or sharply inclined surface of a vehicle being washed when the brush is not rotated, and also does not contact the bottoms of pickup truck beds.

SUMMARY OF THE INVENTION

The above objects and others which will become apparent upon a reading of the following specification and claims are accomplished by a stepped diameter core top brush construction or a constant diameter side brush in which relatively stiff fingers are mounted on a core. The top brush also has a smaller overall diameter than prior top brush designs, i.e., on the order of 40 inches. Both the top and side brushes are rotated at a substantially lower speed (100 rpm or less) while still developing sufficient finger tip stiffness to achieve effective scrubbing action.

The top brush core has a stepped diameter, and an inner core of the main center section of a larger diameter than prior art top brushes, i.e., on the order of 20 inches, such that it will have a much greater tendency to roll over vertically inclined surfaces on a car if the brush is not rotating, thus usually avoiding vehicle or equipment damage in such situations.

The top brush also has an overall smaller diameter when rotating on the order of 40 inches than prior top brush designs with the foam fingers still being held stiff enough to achieve effective scrubbing action.

The top brush core is of a stepped diameter, with a smaller diameter section at each end (i.e., ≈10 inches), which enables passage over an antenna without creating excessive bending of the antenna. The foam fingers 48 are aligned in rows on the end sections to create openness further reducing the changes of antenna damage.

In both the top and side brushes, the brush construction consists of sets of closed cell foam fingers of a tapering shape wider and shorter than the diameter of the core to be stiffer than prior art brush fingers. The core spacer discs are also constructed of closed cell foam sheet material stacked and bonded together into brush sections, with fewer gaps or crevices in which an antenna could be snagged.

The core discs each have aligned square openings which are fitted onto a square drive shaft to establish a driving connection to the brush and to maintain a predetermined alignment of the brush segments.

The foam fingers of the top brush center section are staggered with respect to adjacent fingers to maintain a denser finger pattern in the brush center section for maximizing scrubbing effectiveness.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
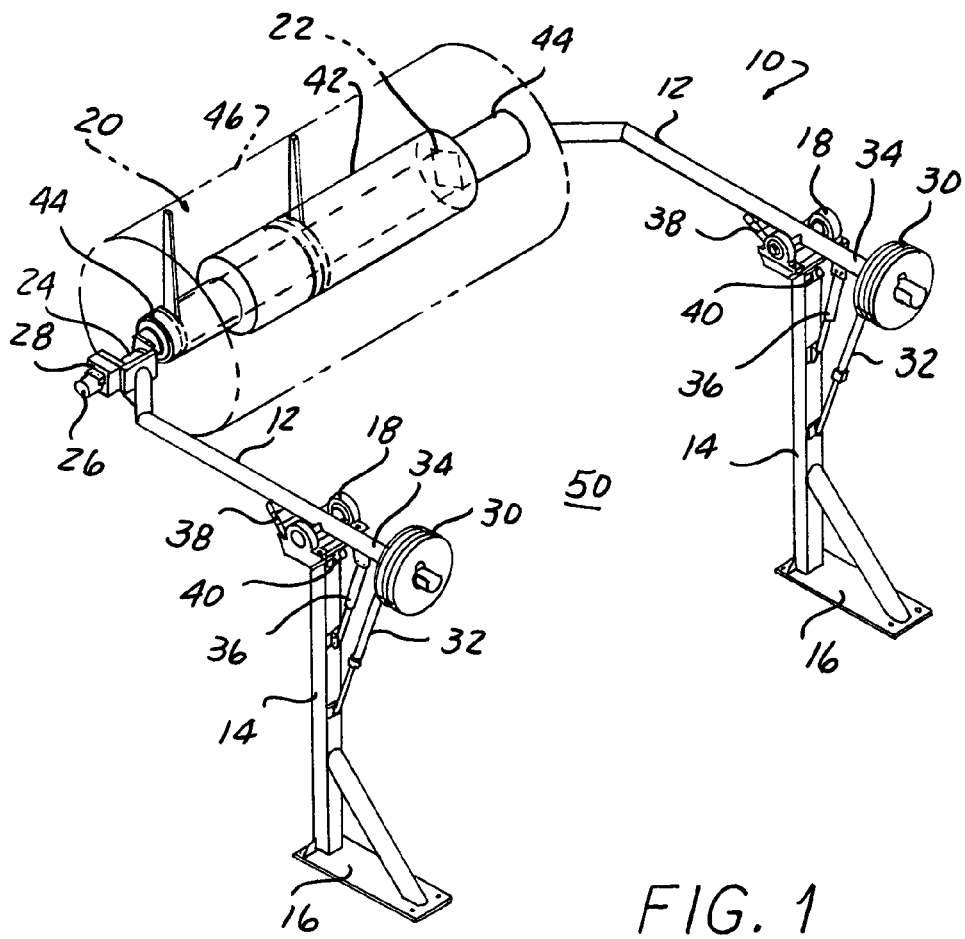
FIG. 1 is a side elevational view of a car wash top brush mechanism incorporating a top brush according to the invention.

Referring to the drawings, FIG. 1 shows a top brush mechanism 10, of a generally conventional design, including a pair of swing arms 12 pivoted atop respective stanchions 14 having bottom plates 40 fixed to a floor surface on either side of a car wash tunnel. Bearing supports 18 allow swinging movement of the arms 12 and corresponding movement of a top brush 20 supported to the outermost ends of the arms 12.

A square center shaft 22 passes through the corresponding square core of the top brush 20 to establish a driven connection therewith. Stub ends of the center shaft 22 are supported in corresponding bearings 24. A hydraulic motor 26 is connected via a torque plate 28 to rotate the shaft 22 and brush 20. A set of counterweights 30 are secured to an overhang section 34 of the arm to counterbalance the weight of the brush 20, leaving a net downward force on the order of 15 to 20 pounds on a vehicle passing along the car wash tunnel 50 with the arms 12 released.

A power cylinder 32 is connected between each overhang section 34 and a respective stanchion 14 to allow the brush to be raised. The power cylinders 32 may be also be operated to drive the brush down on trailing surfaces of the vehicle particularly when the car wash is being operated at a high rate.

When the cylinders 32 are unpressurized, the brush 20 slowly descends to a lowered position at which it engages the vehicle and follows its contour as it moves through the wash tunnel 50.

A pair of shock absorbers 36 are likewise mounted to prevent bouncing as the top brush 20 moves up or down. A stabilizer bar (not shown) extending between the arms also may be installed.

A pair of down stops 38 and up stops 40 are also provided.

This arrangement with the associated hydraulic and electrical circuitry is well known and will not be described here in further detail.

The top brush mechanism 10 is preferably constructed of stainless steel to be able to operate in the wet environment of a car wash without being excessively corroded.

The top brush 20 is uniquely configured to have a stepped diameter core 42, having smaller diameter (≈10 inches) end sections 44, and a larger diameter (≈20 inches) scrubbing center section 46. The larger diameter core 42 of the scrubbing center section 46 will roll much more readily than the prior art 10 inch diameter cores when encountering a vertically inclined surface on a vehicle, causing the core to roll over and past the vehicle contours, rather than wedging against the same as with the brushes having a smaller diameter core. At the same time, the smaller diameter end sections 44 create sufficient clearance with the antennas to avoid breakage.

Figure 2:
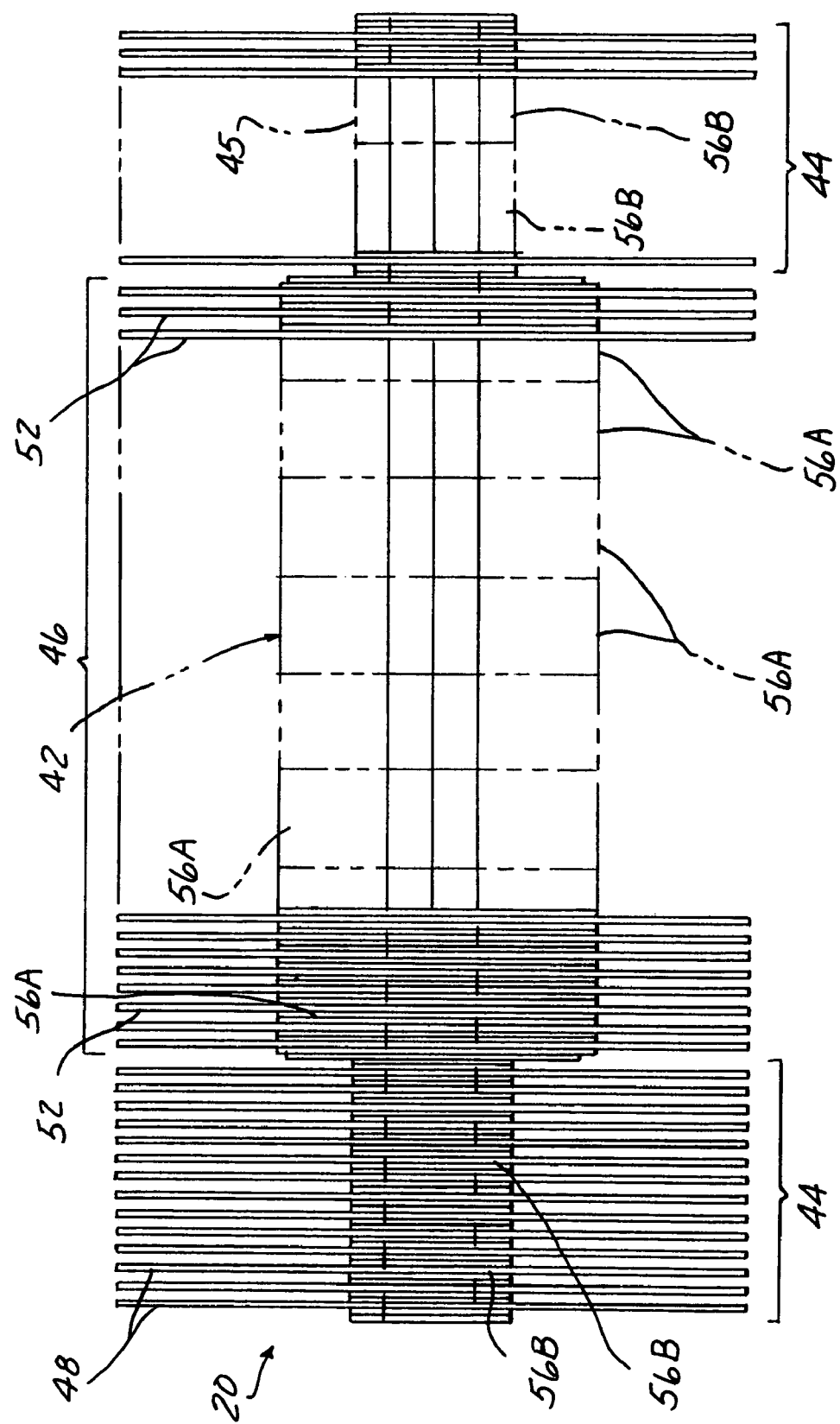
FIG. 2 is a plan view of the top brush included in the mechanism shown in FIG. 1.

A radial array comprised of sets of foam sheet fingers 48 lying flat in a common radial plane project radially from the core 45 of end sections 44 and sets of shorter form fingers 52 lying flat in a common radial plane project radially from the core 42 of the center section 46 so that the outside diameter (≈40 inches) is substantially uniform, as seen in FIG. 2, and substantially smaller than prior foam finger top brushes which were 50–54 inches in diameter. This smaller outside diameter is allowed because of a stiffer shorter finger design.

That is, the length of fingers 52 projecting from the core 42 45 are no longer and preferably shorter than the diameter of the core 42.

The center section core 42 is constructed of segments 56A each several inches in length. Each segment in the center section 46 is constructed of glued together radial arrays of the foam cell fingers 52 with foam cell spacer discs 58 interposed.

The center section core 42 is constructed of segments 56A, 56B, each several inches in length. Each segment in the center section 46 is constructed of glued together radial arrays of the foam cell fingers 52 with foam cell spacer discs 58 interposed.

Figure 3:
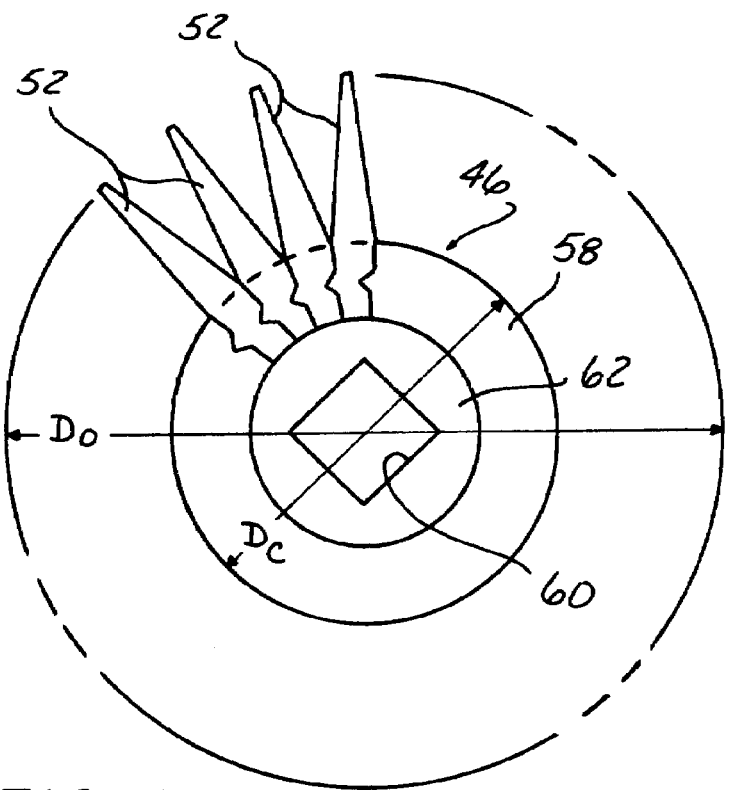
FIG. 3 is an end view of an outboard section of the brush shown in FIG. 2.

The fingers 52 may be die cut from ⅜" thick sheets of closed cell foam to comprise flat pieces with the fingers 52 in each set lying flat in a common radial plane, and have mutually interlocking projecting portions extending between adjacent fingers resisting relative movement to prevent pull out of any individual finger 52 (FIG. 3).

The discs 58 are formed with a square opening 60 to be received over the square shaft 22. A center disc 62 occupies the space defined within the inner ends of the fingers 52.

The end sections 44 are also constructed with sets of closed foam cell fingers 48 and foam spacer discs 64 each having a square opening 66, forming segments 56B glued together in alternating layers. The fingers 48 are longer than the fingers 52 to create the uniform outside diameter of the brush 20. The end section fingers 48 do not have to be short since they do not perform significant scrubbing action.

Figure 5:
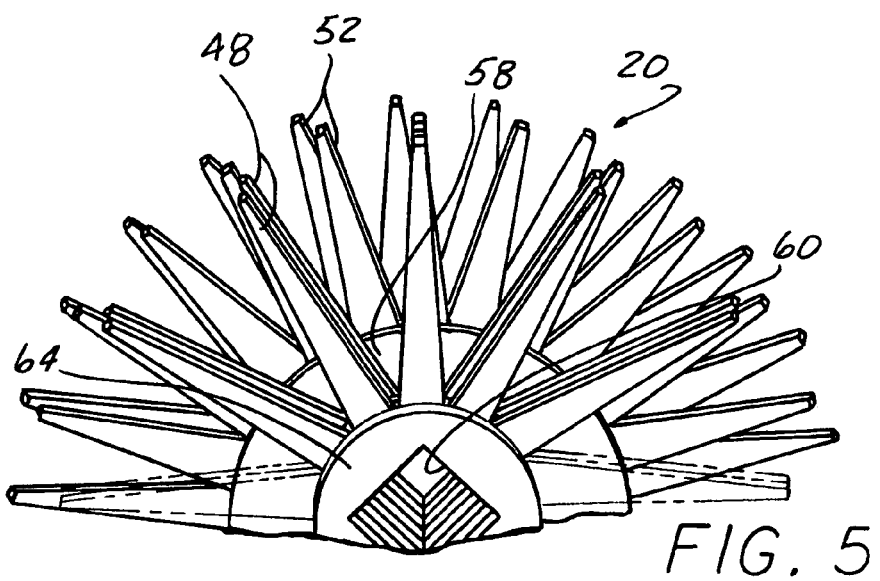
FIG. 5 is a perspective endwise view of the top brush showing the finger arrangements.

The end section fingers 48 are aligned in rows so to create intervening spaces to lessen the chance of snagging an antenna. The center section fingers 52 on the other hand are staggered to create a more uniform distributed pattern of the tips of the fingers 52 across the outside of the center section 46. FIG. 5 shows this arrangement.

As noted, the main center section foam fingers 52 are configured to be relatively short (equal to or preferably less than the core diameter, ≈10 inches projecting from the core 42) and thus stiff compared to conventional foam fingers, with a tapering shape much wider at their inner root ends projecting from the core 42. This root width would be on the order of 2¾ inches and top width on the order of ½ inch for a ⅜ inch thick finger, projecting from the core a distance of about 10–12 inches when constructed of closed cell foam material.

The closed cell foam material used to construct the fingers 52 and 48 and discs 62, 64, 58, is widely available under the trademarks CELL FLEX and MINICELL and is well known to those skilled in the art. As noted, the fingers 48, 52 can be die cut from a foam sheet ⅜ inch thick.

Figure 4:
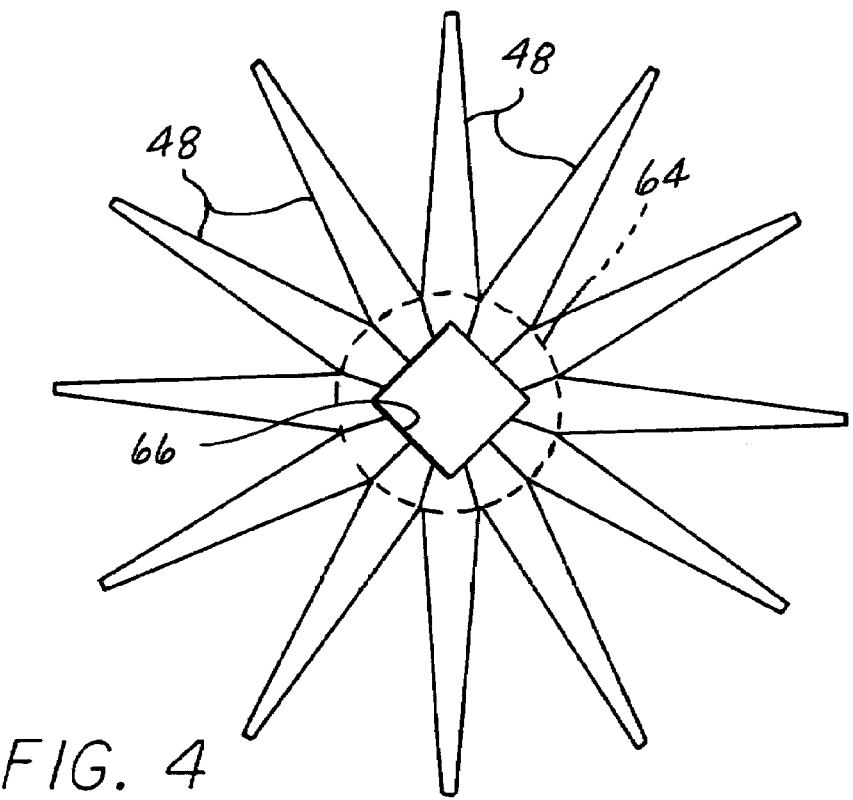
FIG. 4 is an end view of the center section of the top brush shown in FIG. 2.
Figure 6:
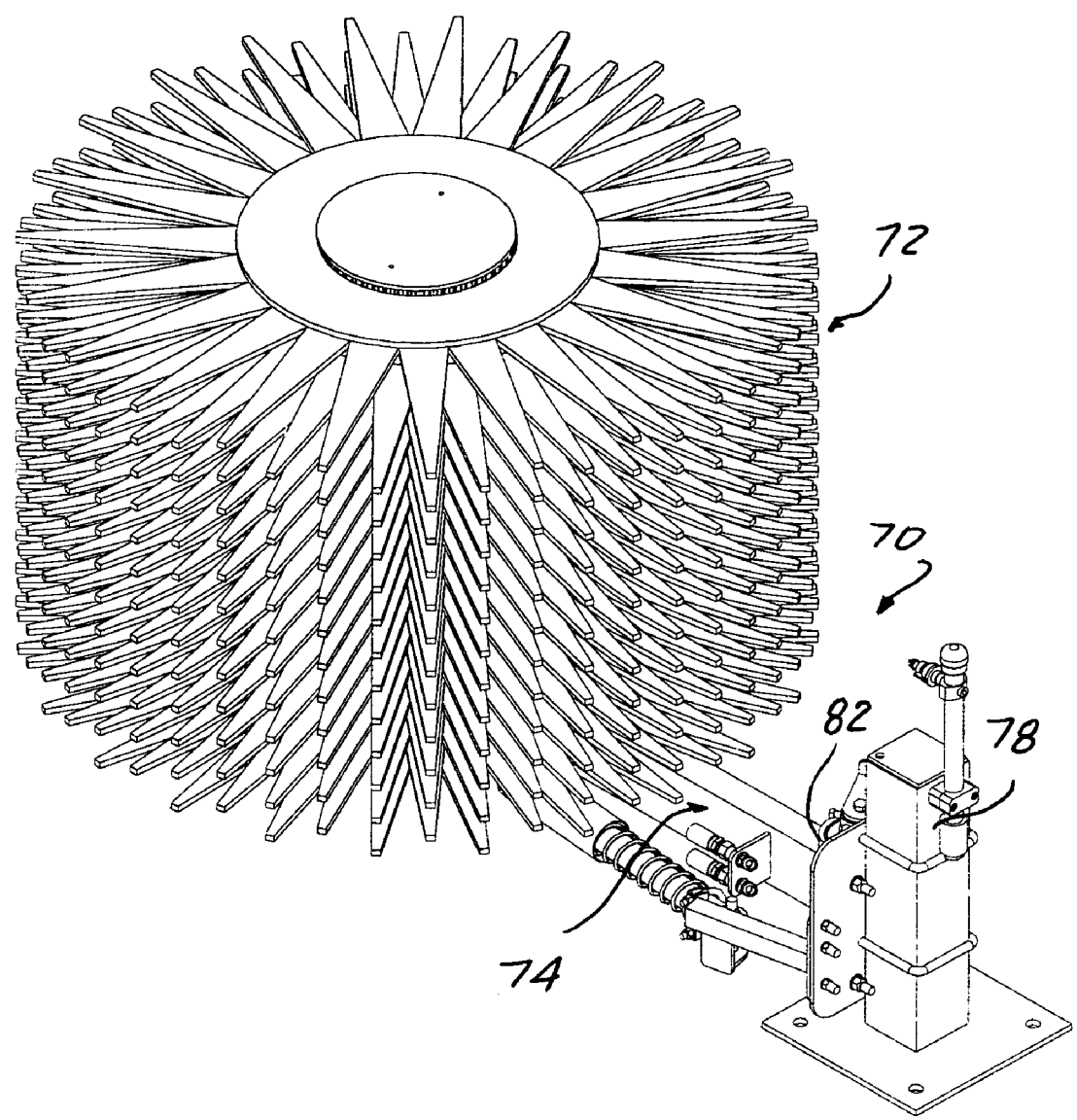
FIG. 6 is a perspective view of a car wash side brush mechanism incorporating a brush according to the present invention.
Figure 7:
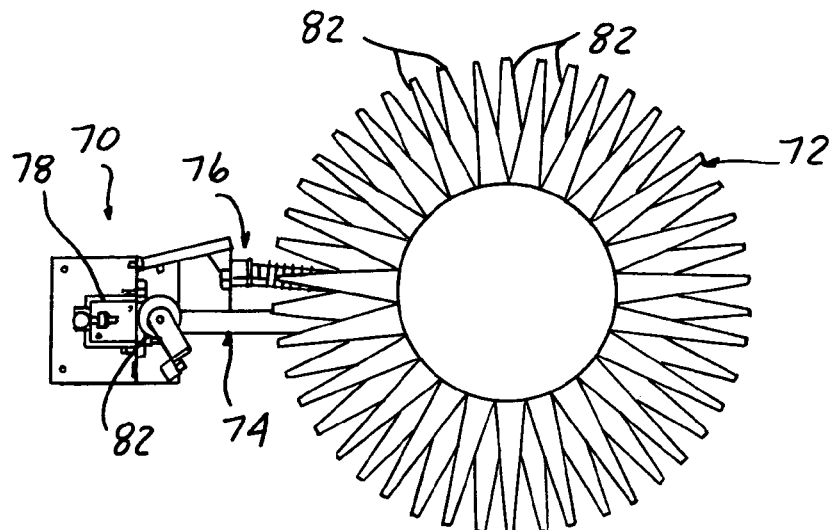
FIG. 7 is a plan view of the side brush mechanism shown in FIG. 6.
Figure 8:
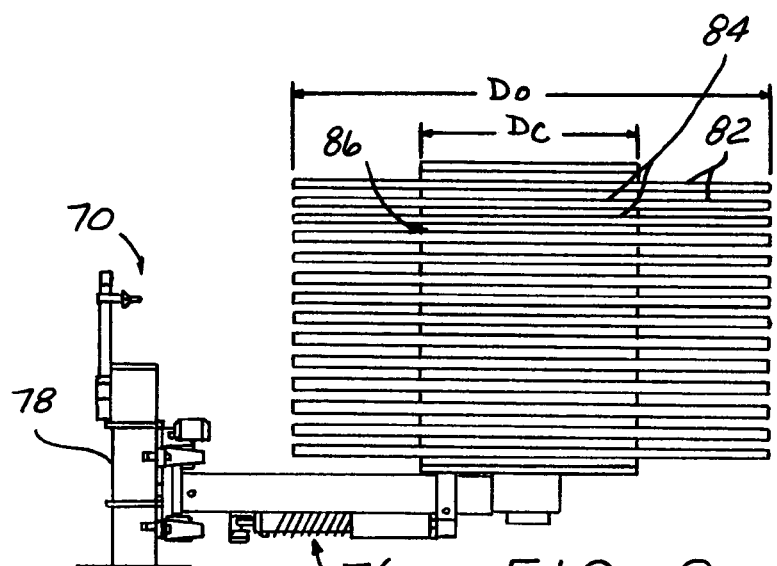
FIG. 8 is a front elevational view of the side brush mechanism shown in FIGS. 6 and 7.
Figure 9:
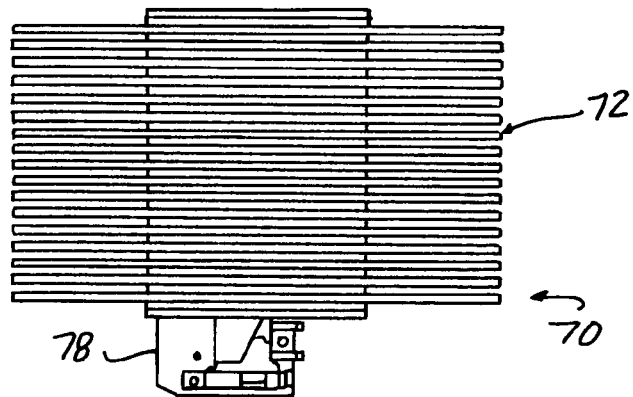
FIG. 9 is a side elevational view of the side brush mechanism shown in FIGS. 6–8.

A particular type of closed cell foam material designated as 380 DVA low density closed cell available from DERTEX Corporation of Saco, Me., has been successfully used to construct brushes according to the invention. An odd number of fingers 52 in the center section 46 are preferably provided to allow staggered assembly and a more uniform distribution of the finger tips to create a more complete scrubbing coverage of the vehicle surfaces. As seen in FIGS. 3 and 4, more washer fingers 52 may also be provided in each center section set than the number of washer fingers 78 in each end section set.

The segments 56A, 56B are assembled onto the square shaft 22.

The top brush 20 so formed is able to be rotated at a slower rate, i.e., in the approximate range of 70–100 rpm, due to the increased finger stiffness, while still producing effective scrubbing action. The smaller diameter end sections 44 prevent extreme bending of car antennas as the top brush 20 moves over the same. The solid stacked construction without crevices avoids snagging antennas. At the same time, the larger center section core 42 will not jam against vertically inclined surfaces on a vehicle moving against the brush 20.

The center section core 42 will roll along the side rails of pickup beds without descending therein to a degree that would allow contact of the tips of the relatively short fingers 52 to contact the bed bottom.

It is noted that top brushes are normally operated only with soap foam from a generator or pump applied to the washed vehicle prior to moving into contact with the brush.

FIGS. 6–9 show a side brush mechanism 70 including a vertically oriented side brush 72 supported on a support arm 74 for swinging motion in the well known manner. A spring-shock absorber assembly controls swinging movement of the arm 74 on bearings 82 on stanchion 78 in the well known manner.

A hydraulic motor 80 is utilized to rotate the brush 22 as with the top brush mechanism 20. Similar to the top brush, the side brush 72 is constructed of flat fingers 82 made of closed cell foam sheet material, of a tapering shape, with radial arrays of fingers and interposed discs 84 of closed cell foam material. Stacked together to form a core, and bonded into shorter sections. The sections are assembled onto a square shaft to create a driving connection for rotating the same, as in the top brush.

The fingers 82 are of the same shorter stiffer construction described above to allow a smaller overall diameter D, i.e., on the order of 44 inches. The core 86 is preferably of relative large diameter (i.e., ≈20 inches) as in the top brush to avoid jam conditions. The fingers 82 are offset to create a staggered relationship of the fingers 82 along the length of the brush 72.

Figure 10:
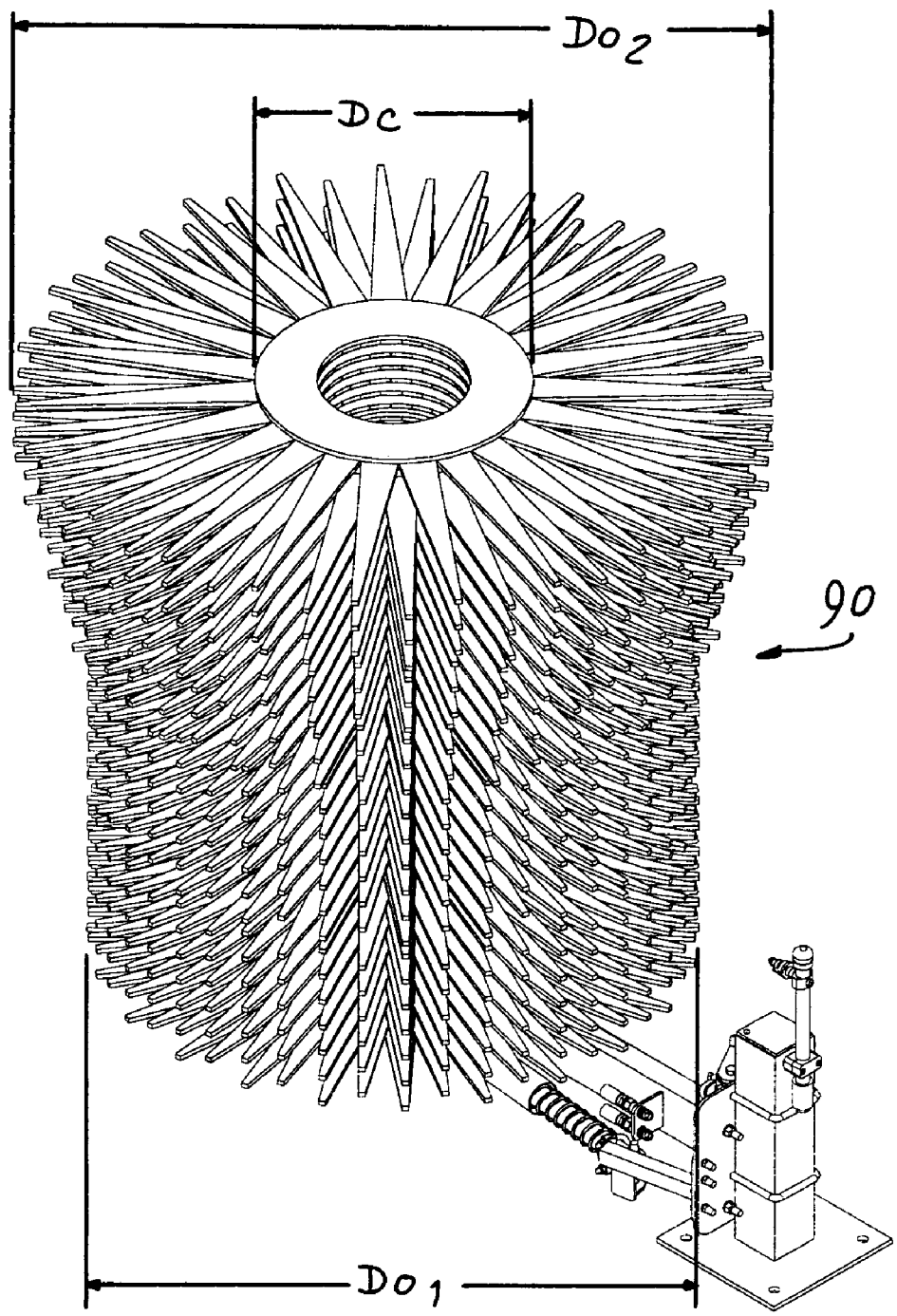
FIG. 10 is a perspective view of another side brush configuration according to the invention.

FIG. 10 shows another stepped outer diameter side brush configuration 90 having a core diameter $D_C$ of 20 inches and outside diameters $D_{O_1}$ and $D_{O_2}$ ranging from 45 inches to 55 inches. The projecting finger length thus ranges from 12½ to 17½ inches, less than the core diameter $D_C$.

Figure 11:
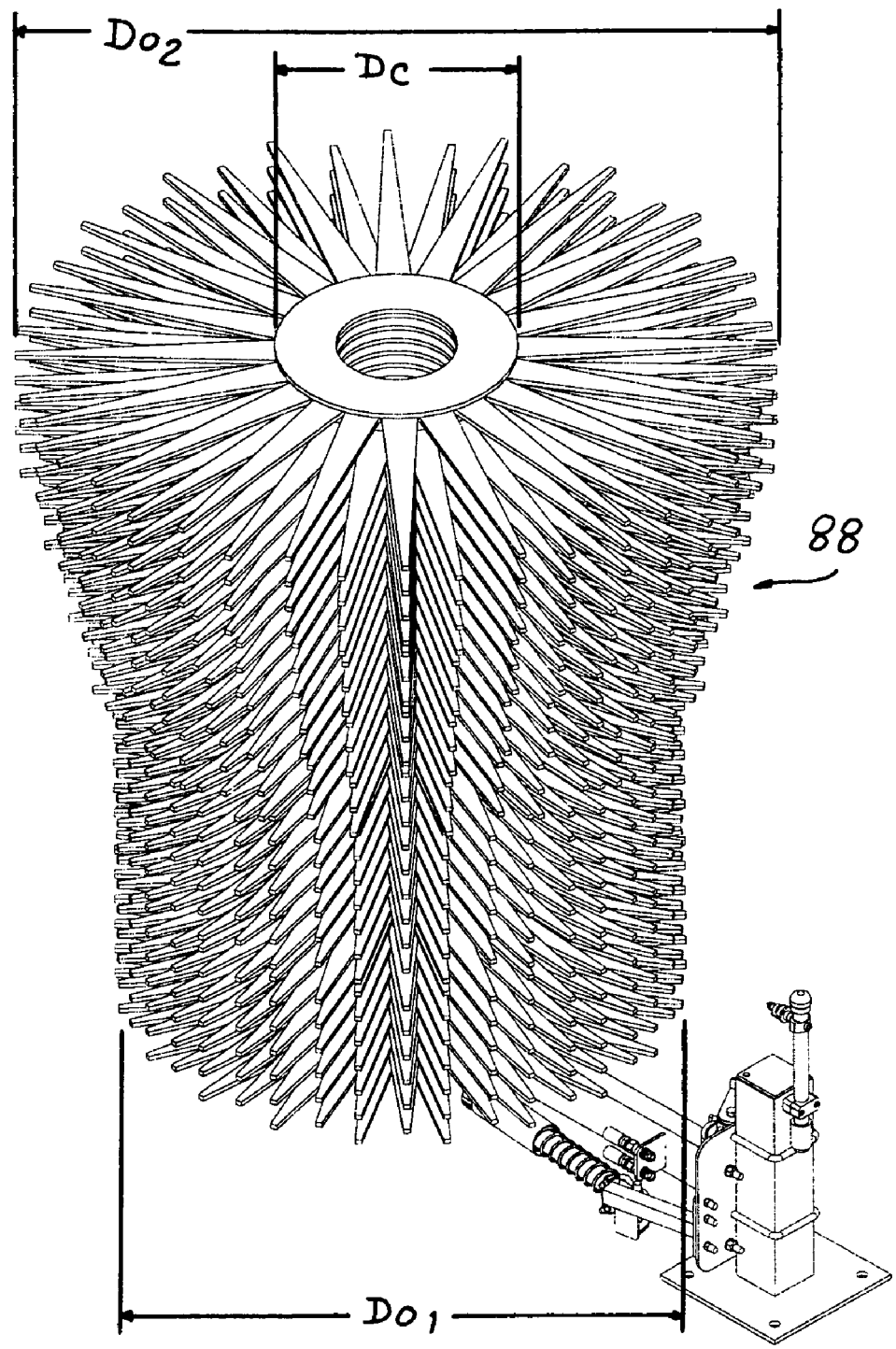
FIG. 11 is a perspective view of yet another side brush configuration according to the invention.

FIG. 11 is yet another stepped outer diameter side brush 88 having a core diameter of 18 inches and an overall diameter $D_{O_1}$ on the order of 42 inches at the bottom and $DO_2$ 53 inches at the top, the projecting finger length ranging from about 13–17½ inches in length, thus being less than the core diameter $D_C$. $D_{O_2}$

The invention claimed is:

1. A top brush assembly for a car wash machine, said top brush assembly supported at either of a pair of ends over a car wash tunnel by a pair of swing arms on either side of said wash tunnel and rotated by a drive shaft on which a top brush is mounted, said top brush comprising:

a stepped diameter core and sets of radially projecting stiff wash fingers secured to said core, said core having smaller diameter end sections and a larger diameter center section, a series of said sets of radially projecting wash fingers secured to each of said core sections and distributed along the length of each core section;

said larger diameter center section of said core comprising most of the overall length of said top brush;

said wash fingers comprising flat pieces of closed cell foam with the wash fingers of each set lying flat in a common radial plane, said wash fingers in said sets attached to said core end sections longer than said wash fingers in said sets attached to said core center section to create a substantially uniform outside diameter of said top brush; and said end sections and center section of said core including aligned spacer discs of closed cell foam interposed between said sets of fingers, each finger in each set comprising a separate piece from the other fingers in said set.

2. The top brush assembly according to claim 1 wherein said wash fingers are of a tapering shape having a larger width at a base portion thereof, and of a length projecting approximately 10 inches from said core center section.

3. The top brush assembly according to claim 1 wherein at least some of said adjacent wash fingers are formed with mutually interlocking portions resisting radial outward movement from the other fingers in each set.

4. The top brush assembly according to claim 1 wherein said wash finger sets and spacers are bonded together in subgroups to form separate sections of said top brush assembled onto said drive shaft.

5. The top brush assembly according to claim 4 wherein each of said core sections have a square opening in the middle to be received on a said drive shaft which is shaped correspondingly.

6. The top brush assembly according to claim 1 wherein the wash fingers in each of said wash fingers sets attached to said core center section are offset circumferentially from the wash fingers in adjacent wash finger sets to be staggered from wash fingers in adjacent wash finger sets and create a substantially uniform distribution of wash finger tips along said center core section.

7. The top brush assembly according to claim 6 wherein said wash fingers in each of said wash finger sets attached to said core end sections are aligned with wash fingers in other wash finger sets attached to the same core end section, and the wash fingers in each finger set attached to said core end sections are fewer in number than said wash fingers in each of said wash finger sets attached to said core center section.

8. The top brush assembly according to claim 1 wherein said top brush has an outer diameter defined by tips of said wash fingers of approximately forty inches.

9. The top brush assembly according to claim 8 wherein said core center section has a diameter of approximately twenty inches.

10. The top brush assembly according to claim 9 wherein said core end sections have a diameter of approximately ten inches.

11. The top brush assembly according to claim 8 wherein said wash fingers have a thickness of approximately ⅜ inches.

12. The top brush assembly according to claim 1 wherein radial sets of said wash fingers attached to said center section of said brush are held between spacer discs bonded thereto to form a center section core having a diameter of approximately 18–20 inches.

13. The top brush assembly according to claim 12 wherein said wash fingers attached to end sections of said brush are held between spacer discs bonded thereto to form end section cores having diameters of approximately 10 inches.

14. The top brush assembly according to claim 1 wherein said wash fingers are each of a tapering shape of a much larger width at a base portion than at a tip portion, and having a length projecting from said core no longer than the diameter of said core to create a stiffness adequate to maintain the tips of the fingers extended when in washing contact to provide effective scrubbing at 70–100 rpm rotation of said brush.

15. The top brush assembly of claim 1 wherein said center section core has a diameter of approximately 18–20 inches and said brush center section has an overall diameter of approximately 40–45 inches.

* * * * *